UNITED STATES PATENT OFFICE.

ALEXANDER GRISWOLD HERRESHOFF AND ALEXANDER LUCAND, OF NEW YORK, N. Y., ASSIGNORS TO INTERNATIONAL MOTOR COMPANY, OF NEW YORK, N. Y., A CORPORATION OF DELAWARE.

WHEEL-BRAKE.

1,396,958.  Specification of Letters Patent.  Patented Nov. 15, 1921.

Application filed March 24, 1920. Serial No. 368,209.

*To all whom it may concern:*

Be it known that we, ALEXANDER G. HERRESHOFF and ALEXANDER LUCAND, both citizens of the United States, and residing in the borough of Manhattan, of the city of New York, in the State of New York, have jointly invented certain new and useful Improvements in Wheel-Brakes, of which the following is a specification, reference being had to the accompanying drawings, forming a part hereof.

This invention relates to improvements in wheel brakes for motor vehicles and is concerned particularly with an improved brake adapted for steering wheels. The principal object of the invention is to provide a wheel brake and an operating mechanism therefor which shall be of simple construction, few parts readily accessible and efficient in operation, whether the vehicle be moving forward or backward and regardless of the angular position of the wheel with respect to the axle. In accordance with the invention, the brake band is mounted on the axle, and preferably on the steering knuckle in the case of brakes for steering wheels and the operating device for the band, which is of the internal expanding type, is journaled on the axle, all of the parts being so interrelated that the band is guided in its circumferential movement and held against distortion and, although of the floating type, is provided with an abutment for one end thereof regardless of the direction of rotation of the wheel. The invention will be described in greater detail in connection with the illustrated embodiment shown in the accompanying drawings in which—

It will appear to one skilled in the art as the description proceeds that the improved brake may be adapted to nonsteering wheels and that its parts may be made wholly independent of the usual parts of a wheel and axle, although the illustrated embodiment shows the brake applied to a steering wheel and shows the supporting member for the band as formed integral with the steering knuckle. Considering then only such a modification and referring particularly to Fig. 1, it appears that the axle $a$ carries thereon a wheel spindle $b$ on which is journaled a steering wheel $c$. The steering knuckle indicated generally at $d$ comprises lower and upper sections $c'$ and $c^2$, respectively, and receives the knuckle pin $e$ which passes through end $a'$ of the axle $a$ in the manner commonly employed. The knuckle pin $e$ is formed of a tapered section $e^4$ similar to the tapered section $a^2$ through the axle end $a'$, thereby forming a bearing seat for the axle. A grease cup $e^5$ may be fitted to the pin $e$ for lubricating purposes. The nut $e^3$ will serve to draw the pin firmly against its tapered seat. With the improved brake the knuckle has certain distinctive features when the knuckle is used to support the brake mechanism, as is the case illustrated herein. The knuckle $d$ is extended downwardly, as at $d'$, and the lower end thereof is formed with an inturned flange $d^2$ for a purpose which will appear. Through the face of the portion $d'$ of the knuckle $d$ is formed a slot $d^5$ of extended width to receive a rock shaft $e'$ on the inner end of which is carried an operating cam $e^2$. The rock shaft $e'$ may conveniently be journaled in a bracket $f$ carried on or formed with the axle $a$ and to the shaft is secured a brake operating arm $g$ to which is connected operating mechanism of any approved character.

Figure 1:
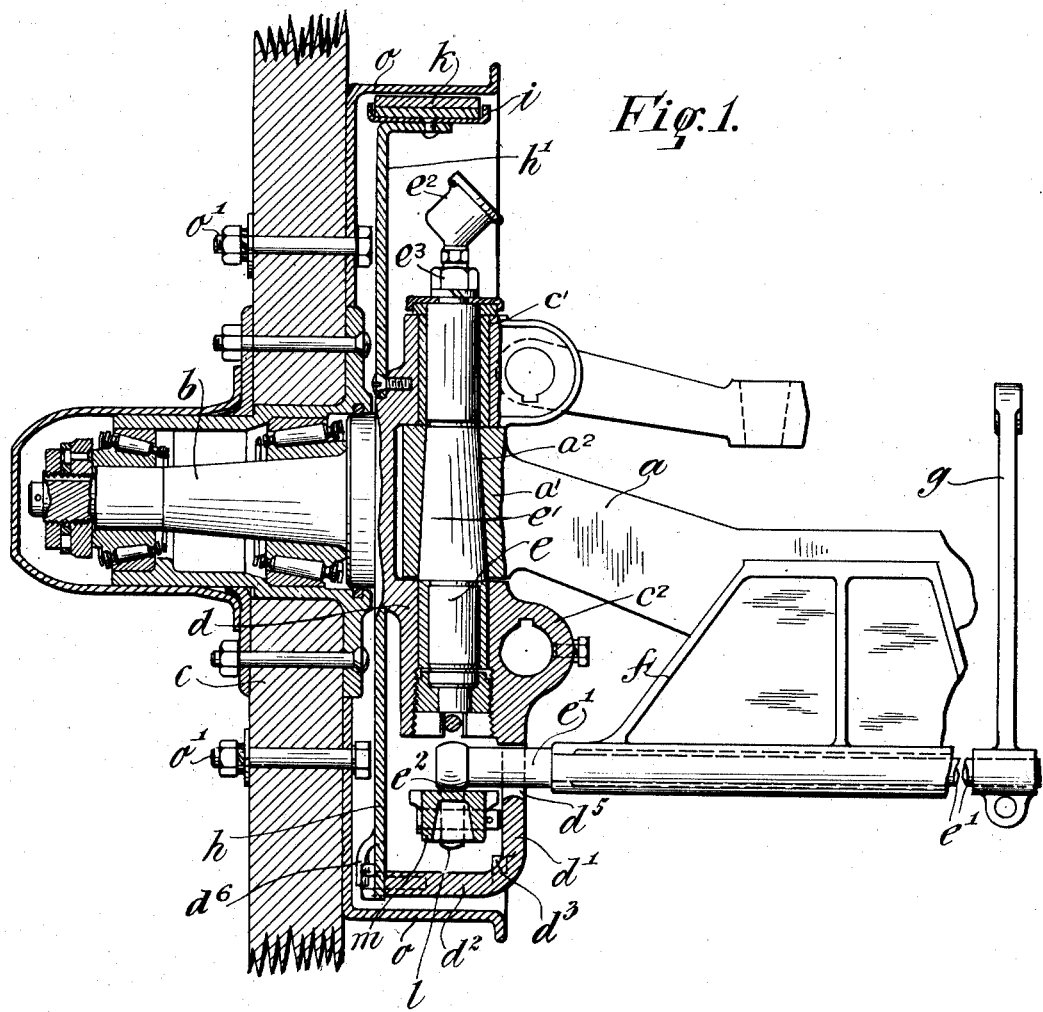
Figure 1 is a view in section taken on the plane indicated by the line 1—1 of Fig. 2 of the improved brake applied to a steering wheel, so much of a wheel and axle being shown as is necessary for an understanding of the invention.
Figure 2:
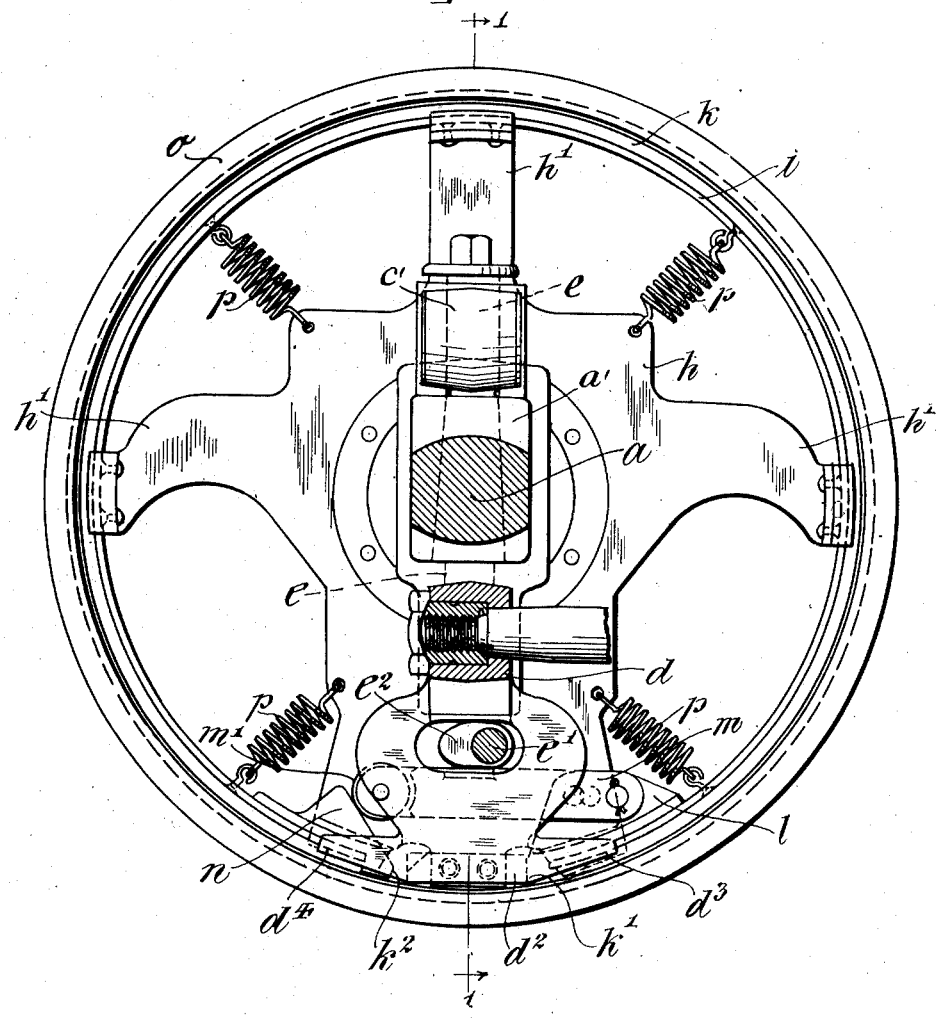
Fig. 2 is a view in side elevation of the improved brake shown in Fig. 1 and looking toward the left as viewed in Fig. 1.

Referring to Fig. 2 the knuckle $d$ is bolted on its inner face to a spider $h$ having a plurality of arms $h'$ to which are secured guiding and supporting channel pieces $i$ for the brake band $k$. The open ends of the brake band $k$ are indicated at $k'$, $k^2$, these ends being held apart by their engagement of the sides of the turned in portion $d^2$ of the knuckle $d$. The vertical section of Fig. 1 is taken on the diametrical plane of the line 1—1 of Fig. 2 and extends through the turned in portion $d^2$ of the knuckle $d$. This turned in portion $d^2$ rests between the open ends of the brake band $k$ and for that reason the parts $k$ and $i$ do not appear in Fig. 1 in the lower part of the figure. At the lower end of the section $d'$ of the knuckle $d$ and at opposite sides of the turned in portion $d^2$ are formed guide ears $d^3$, $d^4$ which serve to confine the ends of the brake band $k$ and guide the band in its contracting and expanding movements.

Adjacent one of the ends $k'$ of the band $k$ is secured a plate $l$ to which is pivotally secured an arm $m$, the other end of which carries a roller $m'$ adapted to ride on the face of a cam piece $n$ which is secured to the other end $k^2$ of the brake band $k$. The operating cam $e^2$ bears against the upper face of the arm $m$.

The brake drum with which the corresponding band $k$ coöperates is indicated at $o$ and may be of any approved form, being bolted to the wheel hub, as by bolts $o'$.

The band $k$ is normally held in contracted position, out of engagement with the brake drum $o$, by means of a plurality of springs $p$ engaged with the band and with the spider $h$. When the brake is applied the shaft $e$ is rocked so as to press the nose of the cam $e^2$ downwardly against the arm $m$. The roller $m'$ on said arm $m$ is thereby forced downwardly against the inclined face of the cam piece $n$ and the ends $k'$, $k^2$ of the brake band $k$ are forced apart thereby expanding the band and moving it uniformly into engagement throughout its length with the brake drum $o$. During this expanding the band is retained in proper relation to the drum by means of the channel pieces $i$ and by the guide flanges $d^3$, $d^4$ on the knuckles $d$ and $d^6$ on the spider $h$. When the wheel is rotating in one direction it will be understood that the band $k$, being of the floating type, will tend to turn with the brake drum $o$. However, one of the ends $k'$, $k^2$ of the band, depending upon the direction of rotation of the wheel, will be arrested in its movement by engagement with the turned in section $d^2$ of the knuckle and be anchored in position, the remaining expansion of the band being effected by movement of that end which thus becomes free. If the wheel is rotated in the opposite direction the band will be applied with equal effectiveness since the other end will, in a similar manner, abut against the turned in section $d^2$ of the knuckle $d$. The spreading action of the arm $m$ through the engagement of the roller $m'$ with the cam piece $n$ is uniform under all conditions of application and regardless of the direction of rotation of the wheel. The band, at the same time, is always positively confined and guided and maintained in proper braking relation to the drum $o$ since the band is carried with the knuckle $d$ and conforms to angular movements of the wheel and the drum. This angular movement of the wheel, as during steering, does not affect the improved braking mechanism since the slot $d^5$ within the knuckle piece $d'$ receives the rock shaft $e'$ loosely and is of such length as to permit the necessary relative angular movement between the knuckle piece $d$ and the axle $a$. The operating arm $m$ conforms to angular movements of the wheel, but its upper face is of such breadth that it will always be engaged operatively by the cam $e^2$ and this cam when rocked will serve to apply the brakes efficiently no matter what the angular position of the wheel.

As pointed out hereinbefore, changes in details of construction may be made without departing from the spirit of the invention. The support for the spider $h$ might be independent of the knuckle $d$ and applied to standard constructions now in use without modification of the knuckle. The specified means shown for accomplishing the desired ends might have substituted therefor such equivalents as are within the skill of a mechanic and where any of the parts are described as being made integral they might be made independent thereof but secured thereto.

We claim as our invention:

1. In combination with a vehicle wheel and supporting spindle therefor, a brake drum carried on the wheel, an open ended internally expanding brake band therefor, a carrier for the band carried with the wheel spindle, an arm pivoted to one end of the band, a cam piece mounted at the other end of the band and engaged by the free end of the arm and a cam operatively engaging the arm to effect the expanding of the brake.

2. In combination with a vehicle wheel and supporting spindle therefor, a brake drum carried on the wheel, an open ended internally expanding brake band therefor, a carrier for the band carried with the wheel spindle, an arm pivoted to one end of the band, a cam piece mounted at the other end of the band and engaged by the free end of the arm, a cam operatively engaging the arm to effect the expanding of the brake, and an abutment carried with the wheel spindle and resting between the ends of the band.

3. In combination with a steering vehicle wheel and steering knuckle, a brake drum carried on the wheel, an open ended internally expanding brake band therefor, a carrier for the band secured to the knuckle, an abutment carried with the knuckle and resting between the ends of the band, an arm pivoted to one end of the band, a cam piece mounted at the other end of the band and engaged by the free end of the arm, and a cam operatively engaging the arm to effect the expanding of the brake.

4. In combination with a steering vehicle wheel and steering knuckle, a brake drum carried on the wheel, an open ended internally expanding brake band therefor, a carrier for the band secured to the knuckle, an abutment carried with the knuckle and resting between the ends of the brake band, an arm pivoted to one end of the band, a cam piece mounted at the other end of the band and engaged by the free end of the arm, a cam operatively engaging the arm to effect the expanding of the brake and a rock shaft for the cam journaled on the vehicle axle, the knuckle being provided with an elongated slot to receive the rock shaft.

5. In combination with a steering vehicle wheel and steering knuckle, a brake drum carried on the wheel, an open ended internally expanding brake band therefor, a carrier for the band secured to the knuckle, an abutment carried with the knuckle and resting between the ends of the band, an arm pivoted to one end of the band, a cam piece mounted at the other end of the band and engaged by the free end of the arm, a cam operatively engaging the arm to effect the expanding of the brake, guide flanges formed with the abutment to hold the ends of the band against displacement and guide pieces formed with the carrier for the band to hold it against displacement.

6. In combination with a steering wheel and steering knuckle, a brake drum carried on the wheel, an open ended internally expanding brake band therefor, a spider for the band secured to the knuckle, supporting and guiding shoes secured to the spider arms and in which the band rests, springs operatively engaging the band and the spider to contract the band, an abutment carried with the knuckle, guide flanges formed with the abutment to hold the ends of the band against displacement and resting between the ends of the band, an arm pivoted to one end of the band, a cam piece mounted at the other end of the band and engaged by the free end of the arm, a cam operatively engaging the arm to effect the expanding of the brake, and a rock shaft for the cam journaled on the vehicle axle, the knuckle being provided with an elongated slot to receive the rock shaft.

This specification signed this 11th day of March, A. D. 1920.

ALEXANDER GRISWOLD HERRESHOFF.
ALEXANDER LUCAND.